May 5, 1964 H. L. MacDONELL 3,132,036
METHOD OF DEVELOPING LATENT FINGERPRINTS
Filed Dec. 29, 1960
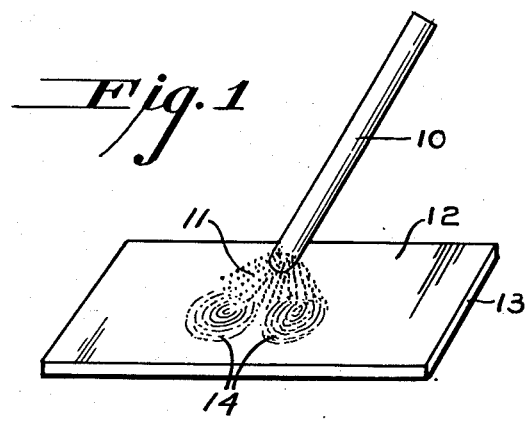
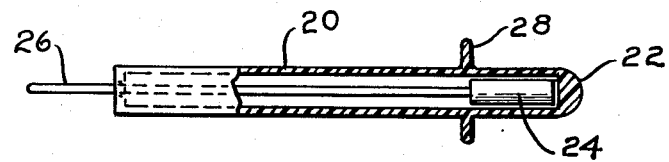
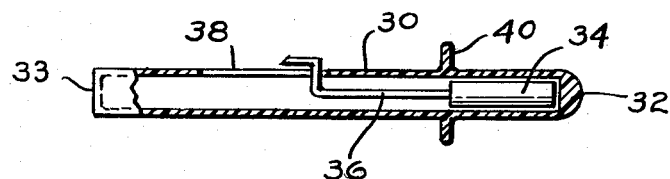
INVENTOR.
HERBERT L. MacDONELL
BY
William H. Dana
ATTORNEY

United States Patent Office 3,132,036
Patented May 5, 1964

3,132,036
METHOD OF DEVELOPING LATENT FINGERPRINTS
Herbert L. MacDonell, Box 1111, Corning, N.Y.
Filed Dec. 29, 1960, Ser. No. 79,304
6 Claims. (Cl. 117—.5)

This invention relates to a novel method for developing latent fingerprints and to a unique apparatus eminently suitable for carrying out the novel process.

Prior methods for developing latent fingerprints on surfaces can be conveniently classified according to the type of material applied to the desired surface; namely, vapor, liquid, or solid developers. The vapor material is characterized by a fuming process in which a suitable material, such as iodine, is heated and the fumes are deposited on the surface containing the latent fingerprints. The iodine vapors are selectively absorbed in the oils of the latent fingerprint in preference to the surface of the material on which the latent fingerprint is deposited. However, such method is cumbersome, requiring a special vaporizing apparatus, including a source of heat, and the resultant developed print leaves much to be desired in relative contrast and must be photographed shortly after formation as the iodine has a tendency to resublime. The liquid-type developer is exemplified by silver nitrate in which a solution of silver nitrate is washed across the surface containing the latent fingerprint and reacts with the salt contained in the latent fingerprint to form silver chloride. Upon subsequent exposure to a source of actinic radiation, the silver chloride is reduced to silver, providing a black image of the fingerprint. This method is limited by the fact that the solution causes bloating of a porous surface such as wood or paper, thereby distorting the fingerprint image and also is of questionable value when the surface has a black or dark color. The most conventionally utilized developer consists of a finely divided solid powder material which is applied to the surface containing the latent fingerprint by brushing, rolling, or spraying the powder on to the desired surface. While such method develops a print having the desired contrast, the abrasive action of the solid powder and the application means used in conjunction therewith tend to streak and/or obliterate the latent fingerprint. Furthermore, such powders are strongly retained by the structure of the surface of the material on which the latent fingerprint has been deposited, such as wood, cloth, and paper, in much the same manner as they are retained by the oils which delineate the latent fingerprint. Therefore, development of fingerprints on such porous surfaces is at best only extremely difficult and requiring exacting skill. A still further objection to conventional powder techniques is that they are extremely wasteful of the powder, which is expensive, and necessitate a large amount of subsequent cleaning of the "dusted" area.

The principal object of this invention is to provide an improved method for the development of latent fingerprints which is more easily and effectively utilized than methods heretofore known.

A further object of this invention is to provide a novel apparatus for conveniently carrying out the method of this invention.

Further objects will be apparent from a consideration of the drawings and description hereinafter set forth.

In the drawings,
FIG. 1 illustrates the method of this invention;
FIG. 2 illustrates the preferred embodiment of an apparatus for performing the method of this invention; and,
FIG. 3 illustrates a desirable modification of the apparatus of FIG. 2.

I have now discovered that latent fingerprints on a surface of a material can be efficiently developed by applying to such surface a uniform layer of magnetizable powder and removing the excess powder by passing a magnet across the layer of powder to remove the powder from that portion of the surface which is free of the oils defining the latent fingerprint and leaving only the powder in contact with such oils, thereby defining the fingerprint. A particularly effective method of practicing this invention comprises collecting a quantity of the magnetizable powder on a magnet and brushing the powder so collected across the desired surface of the material containing the latent fingerprint so that the outer portions of the magnetizable powder contacts the surface, thereby causing deposition of the powder only on those portions of the surface having the oil of the latent fingerprint thereon. Such method of application is extremely desirable where the nature of the surface is such as to prevent ready application of a uniform layer of the powder, such as in the case where the surface is vertical or comprises the under side of a horizontal plane, and also in instances where the latent fingerprint is very delicate as such method subjects it to a minimum amount of abrasion.

The method of this invention is illustrated in FIG. 1 in which is shown in perspective a magnet 10 having a cluster of magnetizable powder 11 surrounding one pole of the magnet 10. The magnet 10 is brushed back and forth across the surface 12 of the body 13 in such manner that the outermost portion of the cluster of magnetizable powder 11 contacts the surface 12. The powder of the cluster 11 adheres to the oil defining the latent fingerprint, but not to portions of the surface 12 devoid of such oils, to produce a visible image of the fingerprint 14. If desired, the magnet may be cleaned by wiping it with a suitable cleaning cloth and subsequently passed back and forth above the developed fingerprint, but not in contact therewith, to remove excess powder from the background of the surface, thereby improving the contrast of the developed fingerprint image.

Suitable magnetizable powders comprise iron, cobalt, or nickel powder or mixtures thereof. The degree of fineness of such powders is limited only by the definition desired in the developed fingerprint, the finer the powder, the more clearly defined the image, but powders of less than about 650 mesh tend to smudge and, therefore, I prefer to utilize powders which have a size of through about 325 mesh on to about 650 mesh. However, I have also found that when magnetizable filings are mixed with such powders, the resultant "brush" formed on the magnet produces perceptively better results in less time than when fine particles are used alone. A particularly suitable mixture comprises about equal amounts by weight of the powder of the preferred size and filings of up to about $\frac{1}{16}$ inch in length, with a length to diameter ratio of about 20:1. As is apparent from the above discussion, my novel method is operative with any reasonably finely divided magnetizable material. Furthermore, when the surface to be dusted has a black or dark color, a white nickel powder, that is one not so finely divided as to be black, is especially suitable and desirable.

I have furthermore found that the most convenient and cleanest method of practicing the method of this invention comprises utilizing an apparatus comprising in combination a hollow, longitudinal body of non-magnetic material, at least one end of said body being closed, a magnet within said hollow body, said magnet being capable of movement within said body along the longitudinal axis of the body, means for displacing the position of the magnet along the longitudinal axis of said body, and means located on the outer surface of the body for restraining and preventing the travel of magnetizable powder therebeyond as the magnet is displaced from the closed end of the body.

A particularly suitable device for carrying out the method of this invention is illustrated, partly in section, in FIG. 2 in which is shown a hollow, elongated body 20 of non-magnetizable material, such as glass, aluminum, or, preferably, an organic plastic, having one end thereof 22 closed, a magnet 24 located within the body, a rod 26 of iron or other suitable magnetizable material which permits the magnet to be moved longitudinally along the axis of the body, and an external collar or washer 28 located on the external surface of the body 20. The collar 28 may either be formed separately and affixed to the body 20 or be made integral therewith.

The device illustrated in FIG. 2 can be utilized in the same manner as the magnet 10 of FIG. 1 to practice the method of this invention as explained above. Upon completion of the dusting of the surface, the remaining cluster of magnetizable material may be returned to the container therefor merely by positioning the cluster above the container and moving the magnet 24 along the longitudinal axis of the body 20 away from the closed end 22 by withdrawing at least a portion of the rod 26 from within the body 20. While the magnetizable powder has a tendency to follow the magnet 24 by travelling up the outer surface of the body 20, the collar 28 prevents such movement therebeyond and the powder falls into the container below.

A modification of the device of FIG. 2 is illustrated, partly in section, in FIG. 3 in which is shown a hollow, elongated body 30, of non-magnetizable material, both ends 32 and 33 of which are sealed, a magnet 34 located within the body 30, a rod 36 of suitable magnetizable material so shaped as to pass through a slot 38 in the body 30 which permits the magnet to be moved longitudinally along the axis of the body 30, and an external collar 40 located on the external surface of the body 30. This modification has the advantage that it can be more compact and more easily operated with one hand than that shown in FIG. 2.

What is claimed is:

1. A method of developing a latent fingerprint on a surface containing said latent fingerprint which comprises applying to said surface a layer of opaque magnetizable powder and passing a magnet across the layer of said powder to remove the powder from that portion of the surface which is free of oils defining the latent fingerprint.

2. The method of claim 1 in which the magnetizable powder comprises white nickel powder.

3. A method of developing a latent fingerprint on a surface containing said latent fingerprint which comprises collecting a cluster of opaque magnetizable powder on a magnet and brushing the cluster of magnetizable powder across said surface.

4. The method of claim 3 in which the magnetizable powder comprises white nickel powder.

5. The method of claim 1 in which the opaque magnetizable powder comprises iron powder.

6. The method of claim 3 in which the opaque magnetizable powder comprises iron powder.

References Cited in the file of this patent

UNITED STATES PATENTS

| | | |
|---|---|---|
| 2,417,762 | Koller | Mar. 18, 1947 |
| 2,623,774 | Hubbard | Dec. 30, 1952 |
| 2,786,439 | Young | Mar. 26, 1957 |
| 2,791,949 | Simmons et al. | May 14, 1957 |
| 2,874,063 | Greig | Feb. 17, 1959 |
| 2,986,831 | Terek et al. | June 6, 1961 |
| 3,032,363 | Clayborne | May 1, 1962 |